United States Patent
Zhang et al.

(10) Patent No.: US 10,023,662 B2
(45) Date of Patent: Jul. 17, 2018

(54) METHOD FOR REDUCING ODORIFEROUS AND/OR TOXIC RESIDUAL MONOMER IN A LATEX

(71) Applicants: DOW GLOBAL TECHNOLOGIES LLC, Midland, MI (US); ROHM AND HAAS COMPANY, Philadelphia, PA (US)

(72) Inventors: Tingke Zhang, Shanghai (CN); Jitao Chen, Shanghai (CN); Minghe Li, Shanghai (CN)

(73) Assignees: Dow Global Technologies LLC, Midland, MI (US); Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 15/341,557

(22) Filed: Nov. 2, 2016

(65) Prior Publication Data

US 2017/0190809 A1    Jul. 6, 2017

Related U.S. Application Data

(62) Division of application No. 14/353,409, filed as application No. PCT/CN2011/081166 on Oct. 24, 2011, now Pat. No. 9,512,241.

(51) Int. Cl.
| | | |
|---|---|---|
| *C08F 6/00* | (2006.01) | |
| *C09D 133/08* | (2006.01) | |
| *C08K 5/42* | (2006.01) | |
| *C08K 3/30* | (2006.01) | |
| *C08K 3/28* | (2006.01) | |

(52) U.S. Cl.
CPC ................ *C08F 6/006* (2013.01); *C08K 3/28* (2013.01); *C08K 3/30* (2013.01); *C08K 5/42* (2013.01); *C09D 133/08* (2013.01); *C08K 2003/309* (2013.01)

(58) Field of Classification Search
CPC .. C08F 6/006; C08K 3/28; C08K 3/30; C08K 5/42
See application file for complete search history.

(56) References Cited

U.S. PATENT DOCUMENTS

| | | | |
|---|---|---|---|
| 4,013,739 A | 3/1977 | Bracke et al. | |
| 4,196,111 A | 4/1980 | Gomez | |
| 4,215,085 A | 7/1980 | Gomez | |
| 4,221,878 A | 9/1980 | Tokas | |
| 4,242,500 A | 12/1980 | Franceschini | |
| 4,251,412 A | 2/1981 | Ferrini | |
| 4,278,582 A | 7/1981 | Miller | |
| 4,396,740 A | 8/1983 | Wozny | |
| 5,087,676 A | 2/1992 | Heider et al. | |
| 5,616,651 A | 4/1997 | Nino et al. | |
| 5,994,457 A | 11/1999 | Stanger et al. | |
| 6,365,709 B1 | 4/2002 | Heibel et al. | |
| 6,433,132 B1 | 8/2002 | Wood et al. | |
| 6,462,138 B1 | 10/2002 | Rupaner et al. | |
| 7,332,565 B2 | 2/2008 | Chowdhry et al. | |
| 8,524,809 B2 | 9/2013 | Bohling et al. | |
| 9,512,241 B2* | 12/2016 | Zhang | C09D 133/08 |
| 2006/0052502 A1* | 3/2006 | Zhao | C09D 5/024 524/425 |
| 2011/0166257 A1 | 7/2011 | Bohling et al. | |
| 2014/0256851 A1 | 9/2014 | Zhang et al. | |

FOREIGN PATENT DOCUMENTS

| | | |
|---|---|---|
| DE | 19741189 A1 | 3/1999 |
| EP | 0119771 A1 | 9/1984 |
| GB | 1355709 | 6/1974 |
| JP | 59161406 | 9/1984 |
| WO | 9721805 A1 | 6/1997 |
| WO | 9745468 A1 | 12/1997 |

OTHER PUBLICATIONS

Araujo et al.; "Techniques for Reducing Residual Monomer Content in Polymers: A Review"; Polymer Engineering and Science; Jul. 2002; vol. 42; No. 7; pp. 1442-1468.

* cited by examiner

*Primary Examiner* — Hannah J Pak
(74) *Attorney, Agent, or Firm* — Karl E. Stauss; Cantor Colburn LLP

(57) ABSTRACT

A new and efficient toxicity and/or odor reducing method for ethyl acrylate and/or acrylonitrile containing aqueous polymer dispersion is disclosed, which comprises contacting a sufficient amount of an ethyl acrylate/acrylonitrile scavenging compound with a stable aqueous dispersion of a polymer to form a polymeric dispersion that contains less than 1 ppm of ethyl acrylate and less than 1 ppm acrylonitrile; wherein the polymer contains a) polymerized units of acylonitrile and/or ethyl acrylate and b) at least 5 ppm of ethyl acrylate and/or acrylonitrile monomers; and wherein the ethyl acrylate/acrylonitrile scavenging compound are contacted with the dispersion independently from contact of the dispersion with any redox pairs.

6 Claims, No Drawings

METHOD FOR REDUCING ODORIFEROUS AND/OR TOXIC RESIDUAL MONOMER IN A LATEX

CROSS REFERENCE TO RELATED APPLICATIONS

This application is a Divisional of U.S. Non-Provisional application Ser. No. 14/353,409, filed Apr. 22, 2014, which is a National Stage application of PCT/CN2011/08116, filed Oct. 24, 2011, both of which are incorporated herein by reference in their entirety.

BACKGROUND

The present invention relates to a method for reducing odoriferous and/or toxic residual monomers, particularly residual ethyl acrylate and/or acrylonitrile in an aqueous polymer dispersion.

Ethyl acrylate (EA) is a common and renewable monomer used in the production of polymers including resins, plastics, rubber, and denture material. It can be prepared by several industrial methods, for example, acrylonitrile can be reacted with ethanol using sulfuric acid as a catalyst to produce ethyl acrylate. It may also be prepared from acetylene, carbon monoxide and ethanol. Ethyl acrylate will readily polymerize upon standing and polymerization is accelerated by heat, light, and peroxides. However, ethyl acrylate has safety issues due to its flammability, toxicity, and high reactivity. One favorable factor of detecting the harmful ethyl acrylate in the polymers is that ethyl acrylate has a very special and bad odor, greater than 2 ppm residual EA in the latex will result in seriously unpleasant odor, general chasing method not easy to remove the trace residual EA monomer.

Acrylonitrile (AN), is another commonly used monomer in polymer industry, such as such as styrene-acrylonitrile (SAN), acrylonitrile butadiene styrene (ABS), acrylonitrile styrene acrylate (ASA) and other synthetic rubbers such as acrylonitrile butadiene (NBR). It is also widely used in coating, adhesive, non-wave, paper, concrete application and contributes lots of performance value like bindering strength, tensile strength, solvent resistance and so on. But it is highly flammable and toxic, and the burning material releases fumes of hydrogen cyanide and oxides of nitrogen. The International Agency for Research on Cancer (IARC) classified it as a Class 2B carcinogen (possibly carcinogenic). Acrylonitrile increases cancer in high dose tests in male and female rats and mice. So, in the industrial application, especially in decorative coating, the residual acrylonitrile monomer is a big issue for human health.

Currently, most approaches for reducing the amount of residual monomers of EA and/or acrylonitrile in aqueous dispersant, focusing on chasing the residual monomers are not efficient and result in other negative effects in performance and bring additional VOC. These methods are disclosed in, for example, U.S. Pat. Nos. 5,087,676, 6,365,709, 6,433,132 and 5,994,457.

Other attempts include using carbonyl compounds and/or their reaction products in the after-treatment of aqueous polymer dispersions as disclosed in the following patent applications/patents.

U.S. Pat. No. 7332565B2 discloses a method for reducing the amount of residual monomer in aqueous polymer dispersions by post-treatment with an initiator system comprises after-treating the aqueous polymer dispersion with addition of an initiator system essentially comprising an inorganic salt of persulfuric acid, methyl ketone, and catalytic amounts of a metal ion as optional which is able to exist in a plurality of valence states.

This method is efficient for reducing residual EA and/or AN monomers to a relatively low level for reducing the odor and toxicity, but for very low threshold EA and high toxic monomer AN, it is difficult to remove completely. Also, less residual monomer need more initiator, it will bring some negative results for performance compromising such as scrub resistance, flexibility and contribute lots of VOCs for the aqueous dispersant.

There is still a desire in the coating area, especially, in the architectural coating area, to find a new method of reducing the residual monomer of EA and/or acrylonitrile in the aqueous polymer dispersion. Therefore, the use of EA and/or acrylonitrile in the coating area could be developed and worries to the toxic and harmful problems of these residual monomers are no longer necessary. This new method is very simple, efficient and environmentally friendly, most important, the cost is low.

STATEMENT OF INVENTION

The present invention is a method comprising contacting a sufficient amount of an ethyl acrylate/acrylonitrile scavenging compound with a stable aqueous dispersion of a polymer to form a polymeric dispersion that contains less than 1 ppm of ethyl acrylate and less than 1 ppm acrylonitrile; wherein the polymer contains a) polymerized units of acrylonitrile and/or ethyl acrylate and b) at least 5 ppm of ethyl acrylate and/or acrylonitrile monomers; and wherein the ethyl acrylate/acrylonitrile scavenging compounds are contacted with the dispersion independently from contact of the dispersion with any redox pairs.

In a second aspect, the present invention is a composition comprising a) an ethyl acrylate/acrylonitrile scavenger and/or an adduct of the ethyl acrylate/acrylonitrile scavenger; and b) a stable aqueous dispersion of a polymer containing units of ethyl acrylate and/or acrylonitrile; wherein if the polymer contains units of ethyl acrylate, the composition contains less than 1 ppm ethyl acrylate monomer, and an ethyl acrylate scavenger, and/or an adduct of ethyl acrylate and the ethyl acrylate scavenger; and wherein if the polymer contains units of acrylonitrile, the composition further contains less than 1 ppm acrylonitrile monomer, and an acrylonitrile scavenger, and/ or an adduct of acrylonitrile and the acrylonitrile scavenger. The present invention provides a toxicity and/or odor reducing method for ethyl acrylate-and/or acrylonitrile-containing aqueous dispersion of a polymer comprising a contacting a sufficient amount of one or more compounds that react with residual ethyl acrylate and acrylonitrile monomers (an ethyl acrylate/acrylonitrile scavenger) to reduce the concentration of the odoriferous compound to less than 1 ppm and preferably an amount to produce a dispersion wherein the residual ethyl acrylate and/or acrylonitrile is slightly detectable or undetectable; preferably, the ethyl acrylate/acrylonitrile scavenger is added to the latex at a concentration of from 0.01 wt % to 5 wt % basing on the dry weight of the aqueous dispersion of the polymer.

The present invention further provides a coating composition comprising the aqueous dispersion of a polymer.

DETAILED DESCRIPTION

For the purpose of describing the components in the compositions of the present invention, all phrases comprising parenthesis denote either or both of the included parenthetical matter and its absence. For example, the phrase "(co)polymer" includes, in the alternative, polymer, copolymer and mixtures thereof;

the phrase "(meth)acrylate" means acrylate, methacrylate, and mixtures thereof, and the phrase "(meth)acrylic" used herein means acrylic, methacrylic, and mixtures thereof.

As used herein, the term "aqueous dispersion" refers to a composition containing discrete polymer particles dispersed in an aqueous medium, for example, aqueous polymer emulsion.

The ethyl acrylate (EA)/acrylonitrile (AN) scavenging compounds used in the toxicity and/or odor reducing method of this invention typically react with residual ethyl acrylate and/or acrylonitrile of the aqueous dispersion at ambient condition or by heating at less than 800° C. The suitable EA/AN scavenging compound contains at least one functional group which can react with double bond of ethyl acrylate and/or acrylonitrile to form the water soluble no volatile saturated compound.

The suitable EA/AN scavenging compound includes, but not limited to bisulfite salt such as ammonium bisulfite, sodium bisulfite, potassium bisulfite; sulfite salt such as ammonium sulfite, sodium sulfite, potassium sulfite; mercaptan carboxylic acid or salt such as mercaptoacetic acid, sodium thioglycolate, calcium thioglycolate, thiohydracylic acid; high boiling point water soluble alkamine such as diethanolamine, N-(2-aminoethyl)ethanolamine, triethyltetramine; amino acid such as glycine, 3-aminopropanoic acid, 4-aminobutyric acid, 5-aminovaleric acid, 6-aminocaproric acid.

Preferably, the EA/AN scavenging compound is water soluble and reacts with the residual ethyl acrylate and/or acrylonitrile in aqueous polymer dispersion at ambient condition. A suitable ambient EA/AN scavenging compound is a bisulfite salt such as ammonium bisulfite, sodium bisulfite, potassium bisulfite; sulfite salt such as ammonium sulfite, sodium sulfite, potassium sulfite.

Suitable level of EA/AN scavenging compound in the aqueous polymer dispersion include from 0.01 to 5 wt %, preferably from 0.01 to 2 wt %, and more preferably, from 0.1 to 1 wt %, based on the total dry weight of the aqueous polymer dispersion.

The EA/AN scavenging compound is added into the aqueous polymer dispersion after the polymerization is finished.

The EA/AN scavenging compound of the present invention is added into the system independently from any redox pairs.

In one embodiment, prior to, concurrent with, or subsequent to contacting the EA/AN scavenging compounds with the aqueous polymer dispersion, one or more redox pairs are contacted with the aqueous polymer dispersion.

In this embodiment, preferably, redox pairs are contacted with the aqueous polymer dispersion prior to contacting the EA/AN scavenging compounds with the aqueous polymer dispersion.

In another embodiment, no redox pair is contacted with the aqueous polymer dispersion. In other words, radical reaction caused by conventional redox pair is not happening in this embodiment.

In another embodiment, the present invention is a composition comprising a) an adduct of the ethyl acrylate/ acrylonitrile scavenger; and b) a stable aqueous dispersion of a polymer containing units of ethyl acrylate and/or acrylonitrile; wherein if the polymer contains units of ethyl acrylate, the composition contains less than 1 ppm ethyl acrylate monomer, and an adduct of ethyl acrylate and the ethyl acrylate scavenger; and wherein if the polymer contains units of acrylonitrile, the composition further contains less than 1 ppm acrylonitrile monomer, and an adduct of acrylonitrile and the acrylonitrile scavenger.

As used herein, an adduct of the ethyl acrylate/ acrylonitrile scavenger is a reaction product of ethyl acrylate and/or acrylonitrile. Such reaction products can readily be identified by gas chromatographic/mass spectrometric (GC/MS) methods. For example, a model experiment can be carried out to pre-determine the reaction products of acrylonitrile and sodium bisulfite. Headspace GC/MS analysis of the latex post-reacted with the scavenger will give at least one product consistent with the model experiment.

The preparation and the selection of monomers of the aqueous polymer dispersion are not limited, and the dispersion may be prepared by well known polymerization techniques, such as suspension polymerization or emulsion polymerization of ethylenically unsaturated monomers.

The EA and/or AN containing aqueous polymer dispersion of the present invention may comprise other copolymerized ethylenically unsaturated nonionic monomers. The ethylenically unsaturated nonionic monomers that may be used in the present invention include, for example, (meth) acrylic ester monomers, where (meth)acrylic ester designates methacrylic ester or acrylic ester, including methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, hydroxyethyl methacrylate, hydroxypropyl methacrylate; (meth) acrylonitrile; (meth)acrylamide; amino-functional and ureido-functional monomers; monomers bearing acetoacetate-functional groups; styrene and substituted styrenes; butadiene; ethylene, propylene, a-olefins such as 1-decene; vinyl acetate, vinyl butyrate, vinyl versatate and other vinyl esters; and vinyl monomers such as vinyl chloride, vinylidene chloride.

The aqueous polymer dispersion of the present invention may further comprises up to 10%, preferably up to 5%, by weight based on the dry weight of the aqueous polymer dispersion, of an ethylenically unsaturated monomer carrying at least one functional group selected from carboxyl, carboxylic anhydride, hydroxyl, amide, sulphonate, phosphonate and mixtures thereof. Examples of these types of monomers are ethylenically unsaturated carboxylic or dicarboxylic acids, especially acrylic or methacric acid, itaconic acid, maleic acid; and amides, especially N-alkylolamides or hydroxyalkyl esters of the above-mentioned carboxylic acids, such as (meth)acrylamide, N-methylol (meth)acrylamide, 2-hydroxyethyl(meth)acrylamide, hydroxyethyl (meth) acrylate, and hydroxypropyl (meth) acrylate.

Conventional free radical initiators may be included such as, for example, hydrogen peroxide, sodium peroxide, potassium peroxide, t-butyl hydroperoxide, cumene hydroperoxide, ammonium and/or alkali metal persulfates, sodium perborate, perphosphoric acid and salts thereof, potassium permanganate, and ammonium or alkali metal salts of peroxydisulfuric acid, typically at a level of 0.01% to 3.0% by weight, based on the weight of total monomer. Redox pairs using the same initiators coupled with a suitable reductant such as, for example, sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, hydroxymethanesulfonic acid, acetone bisulfite, amines such as ethanolamine, glycolic acid, glyoxylic acid hydrate, lactic acid, glyceric acid, malic acid, tartaric acid and salts of the preceding acids may be used. Redox reaction catalyzing metal salts of iron, copper, manganese, silver, platinum, vanadium, nickel, chromium, palladium, or cobalt may be used. Chelating agents for the metals may optionally be used.

Chain transfer agents such as, for example, halogen compounds such as tetrabromomethane; allyl compounds; or mercaptans such as alkyl thioglycolates, alkyl mercaptoalkanoates, and C4-C22 linear or branched alkyl mercaptans may be used to lower the molecular weight of the emulsion polymer and/or to provide a different molecular weight distribution than would otherwise have been obtained with any free-radical-generating initiator(s). Chain transfer agent(s) may be added in one or more additions or continuously, linearly or not, over most or all of the entire reaction period or during limited portion(s) of the reaction period such as, for example, in the kettle charge and in the reduction of residual monomer stage. Chain transfer agent is typically used in the amount of 0 to 5 wt %, based on the total weight of monomer used to form the aqueous emulsion copolymer. A preferred level of chain transfer agent is from 0.01 to 0.5, more preferably from 0.02 to 0.4 and most preferably from 0.05 to 0.2 mole %, based on the total number of moles of monomer used to form the polymer dispersed in the aqueous polymer dispersion of the present invention.

As one of the applications of the low odor aqueous polymer dispersions, a low odor coating composition is achievable by the present invention by using the polymer dispersion as a binder.

The low odor coating composition is suitable for various EA and/or acrylonitrile containing coating systems including, such as acrylic coatings, vinyl acrylic coatings, styrene acrylic coatings, powder coatings, alkyd resin coatings, solvent urethane coatings, and epoxy coatings.

The aqueous coating composition of the present invention contains at least one conventional coatings adjuvant, including but not limited to, coalescing agents, cosolvents, surfactants, buffers, neutralizers, thickeners, non-thickening rheology modifiers, dispersants, humectants, wetting agents, midewcides, biocides, plasticizers, antifoaming agents, defoaming agents, anti-skinning agents, colorants, flowing agents, crosslinkers, anti-oxidants.

The low odor coating composition is suitable for application onto various substrates including bare or pre-painted substrates such as, but not limited to, cement, ceramic, tile, painting, glass, plastic, wood, metal, woven and non-woven textile, and paper; extremely suitable for consumer products with olfaction requirements, which containing or covered by above mentioned substrates.

In the present specification, the technical features in each preferred technical solution and more preferred technical solution can be combined with each other to form new technical solutions unless indicated otherwise. For briefness, the applicant omits the descriptions for these combinations. However, all the technical solutions obtained by combing these technical features should be deemed as being literally described in the present specification in an explicit manner.

The following examples are presented to illustrate the process and the composition of the invention. These examples are intended to aid those skilled in the art in understanding the present invention. The present invention is, however, in no way limited thereby.

EXAMPLES

I. Raw Materials
The following materials were used in the polymerization:

| Abbreviation | Chemical Nature |
|---|---|
| BA | Butyl Acrylate |
| EA | Ethyl Acrylate |
| AN | Acrylonitrile |
| ST | Styrene |
| APS | Ammonia Persulfate |
| SPS | Sodium Persulfate |
| MMA | Methyl Methacrylate |
| AM | Acrylamide |
| (M)AA | (Meth)acrylic Acid |
| SBS | Sodium Bisulfite |
| $Na_2SO_3$ | Sodium Sulfite |
| $H_2O_2$ | Hydrogen Peroxide |
| t-BHP | tert-Butyl hydroperoxide |
| EDTA | Tetrasodium Salt of Ethylenediaminetetraacetic Acid |
| IAA | Erythorbic Acid |

The following materials were used in the formulation:

| Materials | Function | Supplier |
|---|---|---|
| Propylene glycol | Solvent | |
| Acrysol AP-10 | Thickener | Dow Chemical Company |
| Orotan 1288 | Dispersant | Dow Chemical Company |
| Triton CF-10 | Wetting agent | Dow Chemical Company |
| Dispelair CF-246 | Defoamer | Blackburn |
| Ti-Pure R-706 | Pigment | Dupont |
| CC-1000 | Extender | |
| Opaque Ultra E | Extender | Dow Chemical Company |
| Teaxanol | Solvent | Eastman |
| Acrysol RM-2020 NPR | Thickener | Dow Chemical Company |
| Acrysol RM-8W | Thickener | Dow Chemical Company |

The following processes were used in the examples:
The Residual Monomer Test (GC)
The sample was analyzed by headspace-GC/FID using a dual column setup. Column A: DB-Wax; Column B: Rtx-200. The sample was equilibrated at 130° C. for 10 min in Headspace Autosampler. The GC method used was a 45° C. hold for 5 min and then a ramp at 20° C./ min to 240° C.

Odor Evaluation According to Olfaction Sensation in EA Containing Aqueous Dispersion
The odor evaluation was performed as: 10 people selected for smell the in-can odor of different aqueous dispersions, then gave the rate, the rates were given in tables based on the average evaluation. The results were ranked on a scale of 1 to 5 as described below.

| Rank | Odor of EA |
|---|---|
| 5 | Serious |
| 4 | Strong |
| 3 | Middle |
| 2 | Slight |
| 1 | No |

Example 1

An aqueous dispersion A was prepared as following process: A mixture of 26.80 g of sodium dodecyl benzene sulfonate (19.55 wt % solution), and 641.53 g of deionized water was added to the flask and heated to 91° C. under a nitrogen atmosphere. A monomer emulsion (ME) was prepared by mixing 476.72 g of deionized water, 26.80 g of sodium dodecyl benzene sulfonate (19.55 wt % solution), 1428.0 g EA, 421.59 g MMA, 18.87 g AA and 9.30 g AM.

With the contents of the flask at 90° C., the following materials were added in order: a solution of 6.55 g of sodium carbonate in 22.50 g of deionized water, a mixture of 56.44 g of monomer emulsion and 30.15 g of deionized water, and a solution of 7.48 g APS in 18.50 g deionized water. The ME and 390.0 g deionized water were then added to the flask over a period of less than 1.5 hours while maintaining the contents of the flask at a temperature of 88° C.

After the complete addition of the ME, the ME container was rinsed with 35.40 g of deionized water. The flask was allowed to cool to 55° C., a solution of 7.2 g sodium hydroxide in 172.8 g deionized water was added no less than 25 minutes. Next, 60.0 g deionized water to dilute the aqueous dispersant and the contents of the flask were filtered to remove any coagulum. The resulting aqueous polymer dispersion A had a pH of 8.15 and 50.05 wt % solids.

Example 2

An aqueous dispersion B was prepared as following process: A mixture of 26.80 g of sodium dodecyl benzene sulfonate (19.55 wt % solution), and 641.53 g of deionized water was added to the flask and heated to 91° C. under a nitrogen atmosphere. A monomer emulsion (ME) was prepared by mixing 476.72 g of deionized water, 26.80 g of sodium dodecyl benzene sulfonate (19.55 wt % solution), 1428.0 g EA, 421.59 g MMA, 18.87 g AA and 9.30 g AM.

With the contents of the flask at 90° C., the following materials were added in order: a solution of 6.55 g of sodium carbonate in 22.50 g of deionized water, a mixture of 56.44 g of monomer emulsion and 30.15 g of deionized water, and a solution of 7.48 g APS in 18.50 g deionized water. The ME and 390.0 g deionized water were then added to the flask over a period of less than 1.5 hours while maintaining the contents of the flask at a temperature of 88° C.

After the complete addition of the ME, the ME container was rinsed with 35.40 g of deionized water. After 20 minutes, add a mixture of 5.25 g of a solution of 0.2 wt % iron sulfate in water, 1.91 g of a solution of 1 wt % EDTA in water. When the temperature of the solution lower than 70° C., a solution of 1.10 g of 70% t-BHP in 15.0 g of deionized water and a solution of 0.75 g of IAA in 16.0 g of deionized water were added over a period of less than 20 minutes and the contents of the flask was allowed to cool to 45° C. Next, a solution of 7.2 g sodium hydroxide in 172.8 g deionized water was added no less than 25 minutes and the contents of the flask were filtered to remove any coagulum. The resulting aqueous polymer dispersion B had a pH of 8.2 and 49.85 wt % solids.

The resulting samples A and B were subjected to residual monomer test directly or post add SBS or Na2SO3 to the sample for stirring 8 hours (The loading of SBS and Na2SO3 as following Table 1) then to GC residual monomer test, GC test and EA odor evaluation results as shown in Table 1.

TABLE 1

Residual EA Removal with EA/AN scavenging compound and EA Odor Evaluation

| Sample | Post Treated Redox pair | Nucleophile SBS | Na$_2$SO$_3$ | Residual EA (ppm) | Odor of EA |
|---|---|---|---|---|---|
| Dispersion A | No | | | 800 | ND* |
| | | 0.05% | | 400 | ND* |
| | | 0.10% | | 108 | ND* |

TABLE 1-continued

Residual EA Removal with EA/AN scavenging compound and EA Odor Evaluation

| Sample | Post Treated Redox pair | Nucleophile SBS | Na$_2$SO$_3$ | Residual EA (ppm) | Odor of EA |
|---|---|---|---|---|---|
| | | 0.20% | | 25 | 5 |
| | | 0.40% | | <1 | 1 |
| | | | 0.40% | <1 | 1 |
| Dispersion B | t-BHP/IAA | | | 5 | 4 |
| | | 0.005% | | <1 | 2 |
| | | 0.03% | | <1 | 1 |
| | | | 0.03% | <1 | 1 |
| Dispersion A** | No | 0.40% | | <1 | 1 |
| Dispersion B** | t-BHP/IAA | 0.03% | | <1 | 1 |

*High residual monomer, did not odor evaluation
**Treated at 50° C. for 30 minutes

Example 3

An aqueous dispersion C was prepared as following process: A mixture of 26.80 g of sodium dodecyl benzene sulfonate (19.55 wt % solution), and 641.53 g of deionized water was added to the flask and heated to 91° C. under a nitrogen atmosphere. A monomer emulsion (ME) was prepared by mixing 476.72 g of deionized water, 26.80 g of sodium dodecyl benzene sulfonate (19.55 wt % solution), 1428.0 g EA, 421.59 g MMA, 18.87 g AA and 9.30 g AM.

With the contents of the flask at 90° C., the following materials were added in order: a solution of 6.55 g of sodium carbonate in 22.50 g of deionized water, a mixture of 56.44 g of monomer emulsion and 30.15 g of deionized water, and a solution of 7.48 g APS in 18.50 g deionized water. The ME and 390.0 g deionized water were then added to the flask over a period of less than 1.5 hours while maintaining the contents of the flask at a temperature of 88° C.

After the complete addition of the ME, the ME container was rinsed with 35.40 g of deionized water. After 20 minutes, add a mixture of 5.25 g of a solution of 0.2 wt % iron sulfate in water, 1.91 g of a solution of 1 wt % EDTA in water. When the temperature of the solution lower than 70° C., a solution of 1.10 g of 70% t-BHP in 15.0 g of deionized water and a solution of 0.75 g of IAA in 16.0 g of deionized water were added over a period of less than 20 minutes, then a solution of 1.17 g SBS in 20.0 g deionized water was added to flask, holding for 30 minuumtes and the contents of the flask was allowed to cool to 45° C. Next, a solution of 7.2 g sodium hydroxide in 172.8 g deionized water was added and the contents of the flask were filtered to remove any coagulum and obtained the resulting dispersant C. Not found EA in the resulting aqueous polymer dispersion C.

Example 4

An aqueous dispersion D was prepared as following process: A mixture of 33.48 g of sodium dodecyl benzene sulfonate (19.55 wt % solution), and 950.0 g of deionized water was added to the flask and heated to 86° C. under a nitrogen atmosphere. A monomer emulsion (ME) was prepared by mixing 485.0 g of deionized water, 62.18 g of sodium dodecyl benzene sulfonate (19.55 wt % solution), 1336.6 g BA, 346.64 g MMA, 476.5 g AN and 28.48 g MAA.

With the contents of the flask at 85° C., the following materials were added in order: a solution of 2.81 g of sodium carbonate in 22.50 g of deionized water, a mixture of 58.35 g of monomer emulsion and 30.15 g of deionized water, and a solution of 5.61 g APS in 18.50 g deionized water. The ME and 2.81 g APS in 105.0 g deionized water were then added to the flask over a period of less than 3.0 hours while maintaining the contents of the flask at a temperature of 83° C.

After the complete addition of the ME, the ME container was rinsed with 38.50 g of deionized water. The flask was allowed to cool to 55° C., a solution of 4.8 g sodium hydroxide in 115.2 g deionized water was added no less than 30 minutes. Next, 80.0g deionized water to dilute the aqueous dispersant and the contents of the flask were filtered to remove any coagulum. The resulting aqueous polymer dispersion D had a pH of 7.8 and 49.50 wt % solids.

Example 5

An aqueous dispersion E was prepared as following process: A mixture of 33.48 g of sodium dodecyl benzene sulfonate (19.55 wt % solution), and 950.0 g of deionized water was added to the flask and heated to 86° C. under a nitrogen atmosphere. A monomer emulsion (ME) was prepared by mixing 485.0 g of deionized water, 62.18 g of sodium dodecyl benzene sulfonate (19.55 wt % solution), 1336.6 g BA, 346.64 g MMA, 476.5 g AN and 28.48 g MAA.

With the contents of the flask at 85° C., the following materials were added in order: a solution of 2.81 g of sodium carbonate in 22.50 g of deionized water, a mixture of 58.35 g of monomer emulsion and 30.15 g of deionized water, and a solution of 5.61 g APS in 18.50 g deionized water. The ME and 2.81 g APS in 105.0 g deionized water were then added to the flask over a period of less than 3.0 hours while maintaining the contents of the flask at a temperature of 83° C.

After the complete addition of the ME, the ME container was rinsed with 38.50 g of deionized water. After 40 minutes, add a mixture of 4.85 g of a solution of 0.2 wt % iron sulfate in water, 1.83 g of a solution of 1 wt % EDTA in water. When the temperature of the solution lower than 70° C., a solution of 2.50 g of 70% t-BHP in 25.0 g of deionized water and a solution of 1.35 g of IAA in 25.0 g of deionized water were added over a period of less than 40 minutes and the contents of the flask was allowed to cool to 45° C. Next, a solution of 7.2 g sodium hydroxide in 172.8 g deionized water was added and the contents of the flask were filtered to remove any coagulum. The resulting aqueous polymer dispersion E had a pH of 8.25 and 48.9 wt % solids.

The resulting samples D and E were subjected to residual monomer test directly or post add SBS or Na$_2$SO$_3$ to the sample for stirring 8 hours (The loading of SBS and Na$_2$SO$_3$ as following Table 2) then to GC residual monomer test, the results as shown in Table 2.

TABLE 2

Residual AN Removal with EA/AN scavenging compound

| Sample | Post Treated Redox pair | EA/AN scavenging compound | | Residual AN (ppm) |
|---|---|---|---|---|
| | | SBS | Na$_2$SO$_3$ | |
| Dispersion D | No | | | 1200 |
| | | 0.05% | | 1050 |
| | | 0.20% | | 380 |
| | | 0.40% | | <1 |
| | | | 0.40% | <1 |

TABLE 2-continued

Residual AN Removal with EA/AN scavenging compound

| Sample | Post Treated Redox pair | EA/AN scavenging compound | | Residual AN (ppm) |
|---|---|---|---|---|
| | | SBS | Na$_2$SO$_3$ | |
| Dispersion E | t-BHP/IAA | | | 10 |
| | | 0.005% | | 5 |
| | | 0.02% | | <1 |
| | | 0.05% | | <1 |
| | | | 0.02% | <1 |

Example 6

An aqueous dispersion F was prepared as following process: A mixture of 26.80 g of sodium dodecyl benzene sulfonate (19.55 wt % solution), and 641.53 g of deionized water was added to the flask and heated to 91° C. under a nitrogen atmosphere. A monomer emulsion (ME) was prepared by mixing 476.72 g of deionized water, 26.80 g of sodium dodecyl benzene sulfonate (19.55 wt % solution), 1428.0 g EA, 421.59 g MMA, 18.87 g AA and 9.30 g AM.

With the contents of the flask at 90° C., the following materials were added in order: a solution of 6.55 g of sodium carbonate in 22.50 g of deionized water, a mixture of 56.44 g of monomer emulsion and 30.15 g of deionized water, and a solution of 7.48 g APS in 18.50 g deionized water. The ME and 390.0 g deionized water were then added to the flask over a period of less than 1.5 hours while maintaining the contents of the flask at a temperature of 88° C.

After the complete addition of the ME, the ME container was rinsed with 35.40 g of deionized water. After 40 minutes, a solution of 7.2 g sodium hydroxide in 172.8 g deionized water was added no less than 25 minutes and the contents of the flask were filtered to remove any coagulum. The resulting aqueous polymer dispersion F had a pH of 8.1 and 50.15 wt % solids.

Example 7

An aqueous dispersion G was prepared as following process: A mixture of 26.80 g of sodium dodecyl benzene sulfonate (19.55 wt % solution), and 641.53 g of deionized water was added to the flask and heated to 91° C. under a nitrogen atmosphere. A monomer emulsion (ME) was prepared by mixing 476.72 g of deionized water, 26.80 g of sodium dodecyl benzene sulfonate (19.55 wt % solution), 1428.0 g EA, 421.59 g MMA, 18.87 g AA and 9.30 g AM.

With the contents of the flask at 90° C., the following materials were added in order: a solution of 6.55 g of sodium carbonate in 22.50 g of deionized water, a mixture of 56.44 g of monomer emulsion and 30.15 g of deionized water, and a solution of 7.48 g APS in 18.50 g deionized water. The ME and 390.0 g deionized water were then added to the flask over a period of less than 1.5 hours while maintaining the contents of the flask at a temperature of 88° C.

After the complete addition of the ME, the ME container was rinsed with 35.40 g of deionized water. After 20 minutes, add a mixture of 5.25 g of a solution of 0.2 wt % iron sulfate in water, 1.91 g of a solution of 1 wt % EDTA in water. When the temperature of the solution lower than 70° C., a solution of 1.10 g of 70% t-BHP in 15.0 g of deionized water and a solution of 0.75 g of SBS in 16.0 g of deionized water were added over a period of less than 20 minutes and the contents of the flask was allowed to cool to 45° C. Next, a solution of 7.2 g sodium hydroxide in 172.8 g deionized water was added no less than 25 minutes and the contents of the flask were filtered to remove any coagulum. The resulting aqueous polymer dispersion G had a pH of 8.0 and 49.55 wt % solids.

Example 8

An aqueous dispersion H was prepared as following process: A mixture of 26.80 g of sodium dodecyl benzene sulfonate (19.55 wt % solution), and 641.53 g of deionized water was added to the flask and heated to 91° C. under a nitrogen atmosphere. A monomer emulsion (ME) was prepared by mixing 476.72 g of deionized water, 26.80 g of sodium dodecyl benzene sulfonate (19.55 wt % solution), 1428.0 g EA, 421.59 g MMA, 18.87 g AA and 9.30 g AM.

With the contents of the flask at 90° C., the following materials were added in order: a solution of 6.55 g of sodium carbonate in 22.50 g of deionized water, a mixture of 56.44 g of monomer emulsion and 30.15 g of deionized water, and a solution of 7.48 g APS in 18.50 g deionized water. The ME and 390.0 g deionized water were then added to the flask over a period of less than 1.5 hours while maintaining the contents of the flask at a temperature of 88° C.

After the complete addition of the ME, the ME container was rinsed with 35.40 g of deionized water. After 20 minutes, add a mixture of 5.25 g of a solution of 0.2 wt % iron sulfate in water, 1.91 g of a solution of 1 wt % EDTA in water. When the temperature of the solution lower than 70° C., a solution of 2.20 g of 70% t-BHP in 15.0 g of deionized water and a solution of 1.50 g of SBS in 16.0 g of deionized water were added over a period of less than 20 minutes and the contents of the flask was allowed to cool to 45° C. Next, a solution of 7.2 g sodium hydroxide in 172.8 g deionized water was added no less than 25 minutes and the contents of the flask were filtered to remove any coagulum. The resulting aqueous polymer dispersion H had a pH of 8.25 and 49.99 wt % solids.

Dispersant F and G were heating for 4 hours for residual EA test. Then treated F and G with different amine and heating for 4 hours at 50° C., the finial residual EA monomer showed in Table 3.

TABLE 3

Residual EA Removal with Amine

| Sample | Post Treated Redox pair | EA/ AN scavenging compound | Residual EA (ppm) |
|---|---|---|---|
| Dispersion F | No | No | 386 |
| | | 0.05% Hydroxyethyl-ethylenediamine | 274 |
| | | 0.1% Hydroxyethyl-ethylenediamine | 144 |
| | | 0.2% Hydroxyethyl-ethylenediamine | 37 |
| | | 0.25% Hydroxyethyl-ethylenediamine | <1 |
| | | 0.2% Diethylenetriamine | 8 |
| Dispersion G | t-BHP/SBS | No | 48 |
| | | 0.05% Hydroxyethyl-ethylenediamine | 2 |
| | | 0.05% Glycine | 28 |
| | | 0.05% Ethanolamine | 26 |
| | | 0.05% Diethylenetriamine | 12 |
| Dispersion H | t-BHP/SBS (double) | No | 13 |
| | | 0.05% Hydroxyethyl-ethylenediamine | <1 |
| | | 0.05% Glycine | 10 |
| | | 0.05% Ethanolamine | 6 |
| | | 0.05% Diethylenetriamine | 2 |

It has been discovered that contacting a sodium sulfite or sodium bisulfite or hydroxylethylethylenediamine with a latex containing residual ethyl acrylate and/or acrylonitrile, with or without a redox pair chaser, significantly reduces the levels of the aforementioned odor bodies to levels where they cannot be detected by olfactories. As shown in Table 1 (Dispersions B), mere addition of a redox pair t-BHP/IAA by itself does not reduce EA levels to less than 5 ppm; similarly, Table 2 (Dispersion E) shows that the redox pair alone does not reduce AN levels to less than 10 ppm. Additional 0.02% SBS results in less than 1 ppm residual EA or AN in the latex.

Example 9

The latex paint formulation with dispersant B is in Table 4.

TABLE 4

Latex Paint Formulation Base on the Dispersant B

| Ingredients (grams) | Paint A | Paint B (with SBS) |
|---|---|---|
| Water | 150.0 | 150.0 |
| Propylene Glycol | 15.0 | 15.0 |
| Acrysol AP-10 | 2.0 | 2.0 |
| Orotan 1288 | 4.0 | 4.0 |
| Triton CF-10 | 2.00 | 2.00 |
| Dispelair CF-246 | 1.00 | 1.00 |
| Ti-Pure R-706 | 180.0 | 180.0 |
| CC-1000 | 140.0 | 140.0 |
| Dispersion B | 320.0 | 320.0 |
| Ropaque Ultra E | 80.0 | 80.0 |
| Texanol | 18.0 | 18.0 |
| Dispelair CF-246 | 1.00 | 1.00 |
| Acrysol RM-2020 NPR | 4.0 | 4.0 |
| Acrysol RM-8W | 0.3 | 0.3 |
| SBS | | 0.1 |
| Water | 82.7 | 82.6 |
| Total | 1000.0 | 1000.0 |
| EA Odor | Strong | Not found |

The invention claimed is:

1. A composition comprising a) an ethyl acrylate/acrylonitrile scavenger selected from the group consisting of bisulfite salt, sulfite salt, mercaptan carboxylic acids or salts thereof, high boiling point water soluble alkamines, amino acids, and a combination thereof, and/or an adduct of the ethyl acrylate/acrylonitrile scavenger; and b) a stable aqueous dispersion of a polymer containing polymerized units of ethyl acrylate and/or acrylonitrile; wherein if the polymer contains polymerized units of ethyl acrylate, the composition contains less than 1 ppm ethyl acrylate monomer, and an ethyl acrylate scavenger, and/or an adduct of ethyl acrylate and the ethyl acrylate scavenger; and wherein if the polymer contains polymerized units of acrylonitrile, the composition further contains less than 1 ppm acrylonitrile monomer, and an acrylonitrile scavenger, and/or an adduct of acrylonitrile and the acrylonitrile scavenger.

2. The composition according to claim 1 wherein the ethyl acrylate/acrylonitrile scavenger is from 0.01 wt % to 5 wt % based on the dry weight of the aqueous dispersion of the polymer.

3. The composition according to claim 1 wherein the ethyl acrylate/acrylonitrile scavenger is a bisulfite salt or a sulfite salt.

4. The composition according to claim 3 wherein the bisulfite salt is ammonium bisulfite, sodium bisulfite, or potassium bisulfite; and the sulfite salt is ammonium sulfite, sodium sulfite, or potassium sulfite.

5. A coating composition comprising the composition according to claim 1, a pigment, a rheology modifier, and one or more additives.

6. The composition according to claim 1, further comprising one or more redox pairs.

\* \* \* \* \*